United States Patent
Umebayashi et al.

(10) Patent No.: US 7,055,340 B2
(45) Date of Patent: Jun. 6, 2006

(54) REMOTELY OPERABLE AIR CONDITIONING SYSTEM FOR VEHICLE

(75) Inventors: Makoto Umebayashi, Chiryu (JP); Yoshinori Yanagimachi, Takahama (JP); Tomohiro Inada, Kariya (JP)

(73) Assignee: DENSO Corporation, Kariya (JP)

(*) Notice: Subject to any disclaimer, the term of this patent is extended or adjusted under 35 U.S.C. 154(b) by 93 days.

(21) Appl. No.: 10/771,255

(22) Filed: Feb. 3, 2004

(65) Prior Publication Data

US 2004/0194479 A1    Oct. 7, 2004

(30) Foreign Application Priority Data

Feb. 3, 2003    (JP)    ............................. 2003-026468

(51) Int. Cl.
*B60H 1/32*    (2006.01)

(52) U.S. Cl. .......................................... 62/244; 236/51
(58) Field of Classification Search ................. 62/236, 62/244; 165/42, 43; 236/51
See application file for complete search history.

(56) References Cited

U.S. PATENT DOCUMENTS

| 5,361,593 A | 11/1994 | Dauvergne |
| 5,791,407 A * | 8/1998 | Hammons ..................... 165/202 |
| 6,357,244 B1 * | 3/2002 | Mori ........................... 62/231 |
| 6,663,010 B1 * | 12/2003 | Chene et al. ................. 236/51 |

FOREIGN PATENT DOCUMENTS

| JP | 8-149608 | 6/1996 |
| JP | 2002-219926 | 8/2002 |

* cited by examiner

*Primary Examiner*—William E. Tapolcai
(74) *Attorney, Agent, or Firm*—Harness, Dickey & Pierce, PLC

(57) ABSTRACT

A control device is provided in a vehicle to control an air conditioning apparatus and thereby to control ventilation and air conditioning of a passenger room of the vehicle. A mobile device communicates with the control device in a parked state of the vehicle to selectively control a first device, which performs ventilation of the passenger room, and a second device, which performs air conditioning of the passenger room, of the air conditioning apparatus in such a manner that at least one of the first device and the second device is selectively operated upon reception of a corresponding operational instruction from the operating device.

14 Claims, 8 Drawing Sheets

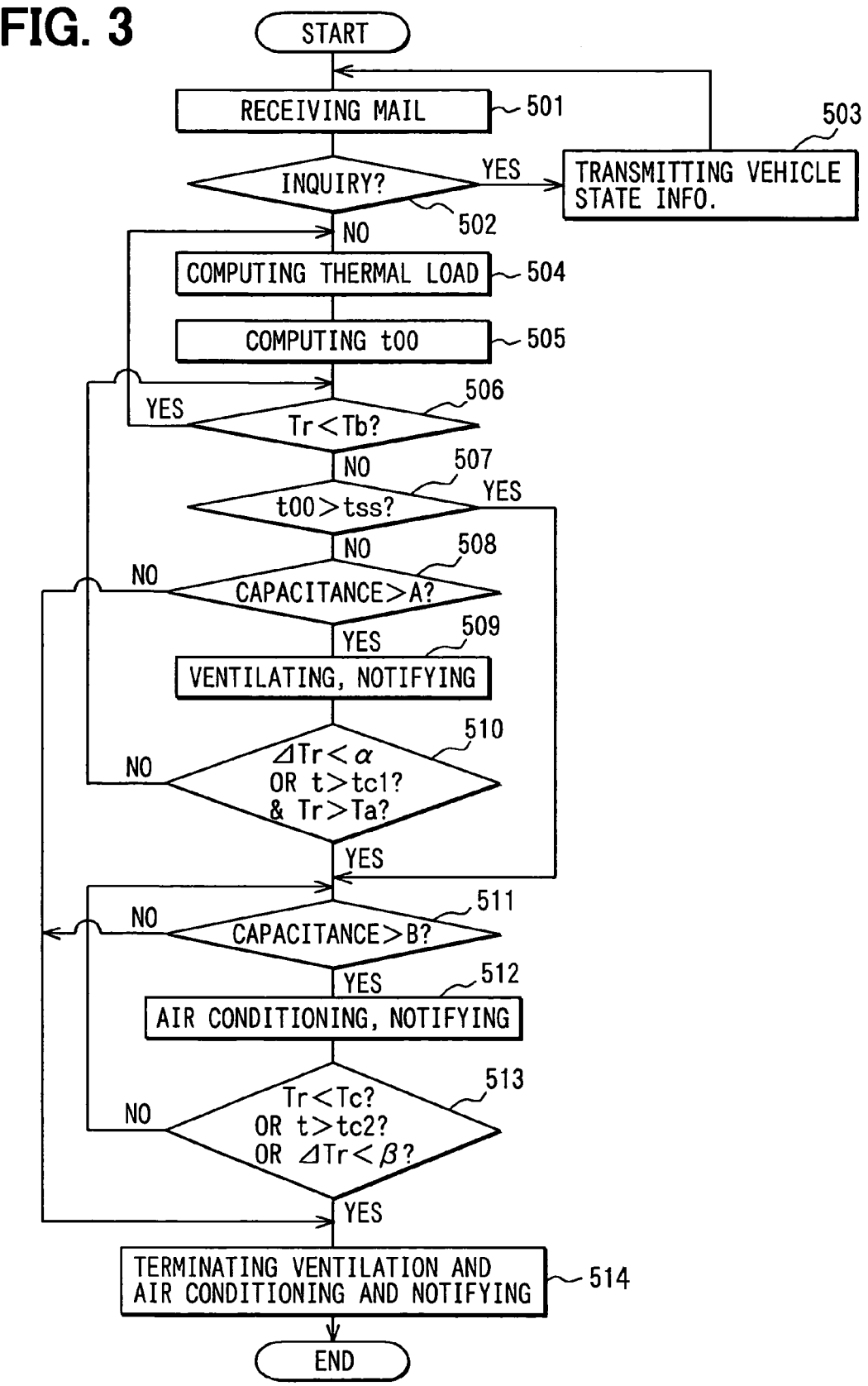

FIG. 4

```
SENDER : xxxxx
DESTINATION : yyyy@zzzz
SUBJECT MATTER : VENTILATION & AIR CONDITIONING
                 SETTINGS
```
```
ID : aaaaaaa
SET TEMPERATURE : Tc (°C)
ESTIMATED BOARDING TIME : ☑ RESERVATION
              8/1 13:00    ☐ IMMEDIATE
SETTINGS :
         ☐ AUTO    ☑ MANUAL
DETAIL SETTINGS :
         ☑ VENTILATION    ☑ AIR CONDITIONING
         ☐ AROMATIZATION
OPERATION TIME :
         VENTILATION : 15 (min.)
         AIR CONDITIONING : 5 (min.)
```
~2a

FIG. 5

```
SENDER : yyyy@zzzz
DESTINATION : xxxxx
SUBJECT MATTER : VENTILATION & AIR CONDITIONING
                 SETTINGS
```
```
SET TEMPERATURE : Tc (°C)
ROOM TEMPERATURE : A (°C)
ESTIMATED NECESSARY TIME PERIOD : 20 (min.)
OPERATIONAL STATE :
VENTILATING PASSENGER ROOM
```
~2a

REMOTELY OPERABLE AIR CONDITIONING SYSTEM FOR VEHICLE

CROSS REFERENCE TO RELATED APPLICATION

This application is based on and incorporates herein by reference Japanese Patent Application No. 2003-26468 filed on Feb. 3, 2003.

BACKGROUND OF THE INVENTION

1. Field of the Invention

The present invention relates to a remotely operable air conditioning system, which performs ventilation and air conditioning of a passenger room of a parked vehicle upon reception of a corresponding instruction from a remote operating device.

2. Description of Related Art

In general, the temperature of a passenger room of a parked vehicle is not maintained at a comfortable temperature due to influences of outside air and solar radiation, and it takes time to adjust the room temperature to the comfortable temperature after boarding of a user into the vehicle. To address the above disadvantage, Japanese Unexamined Patent publication No. 2002-219926 and Japanese Unexamined Patent Publication No. 8-149608 disclose a technique for adjusting the room temperature of the passenger room to a comfortable temperature at the time of boarding of a user into the passenger room. In this technique, an air conditioning apparatus is operated in advance before the boarding of the user into the passenger room through remote control of the air conditioning apparatus from a cellular phone.

When the air conditioning apparatus is activated to adjust the temperature of the passenger room from the beginning of the operation, electric power consumption of an electric compressor of a refrigeration cycle is increased, causing waste of electric power. Also, this may cause an abrupt reduction in capacitance of a vehicle power source, such as a vehicle battery.

SUMMARY OF THE INVENTION

The present invention addresses the above disadvantages. Thus, it is an objective of the present invention to provide an air conditioning system, which can minimize its power consumption at the time of decreasing the room temperature of a passenger compartment of a parked vehicle.

To achieve the objectives of the present invention, there is provided an air conditioning system for a vehicle. The air conditioning system includes an operating device, an air conditioning apparatus, at least one power source and a control device. The operating device is provided separately from the vehicle and is operable at a location remote from the vehicle. The air conditioning apparatus is provided in the vehicle and includes a first device and a second device. The first device performs ventilation of a passenger room of the vehicle. The second device includes a refrigeration cycle and performs air conditioning of the passenger room. The at least one drive source is provided in the vehicle and supplies power to the air conditioning apparatus. The control device is provided in the vehicle to control the air conditioning apparatus and thereby to control the ventilation and the air conditioning of the passenger room. The operating device communicates with the control device in a parked state of the vehicle to selectively control the first device and the second device in such a manner that at least one of the first device and the second device is selectively operated upon reception of a corresponding operational instruction from the operating device.

BRIEF DESCRIPTION OF THE DRAWINGS

The invention, together with additional objectives, features and advantages thereof, will be best understood from the following description, the appended claims and the accompanying drawings in which:

FIG. 3 is a flowchart showing operation of the first embodiment;

FIG. 4 is a diagram showing an exemplary outgoing data screen of an operational command input arrangement and of a display arrangement of a mobile device according to the first embodiment;

FIG. 5 is a diagram showing an exemplary incoming data screen of the mobile device;

DETAILED DESCRIPTION OF THE INVENTION

Various embodiments of the present invention will be described with reference to the accompanying drawings.

FIRST EMBODIMENT

Figure 1:
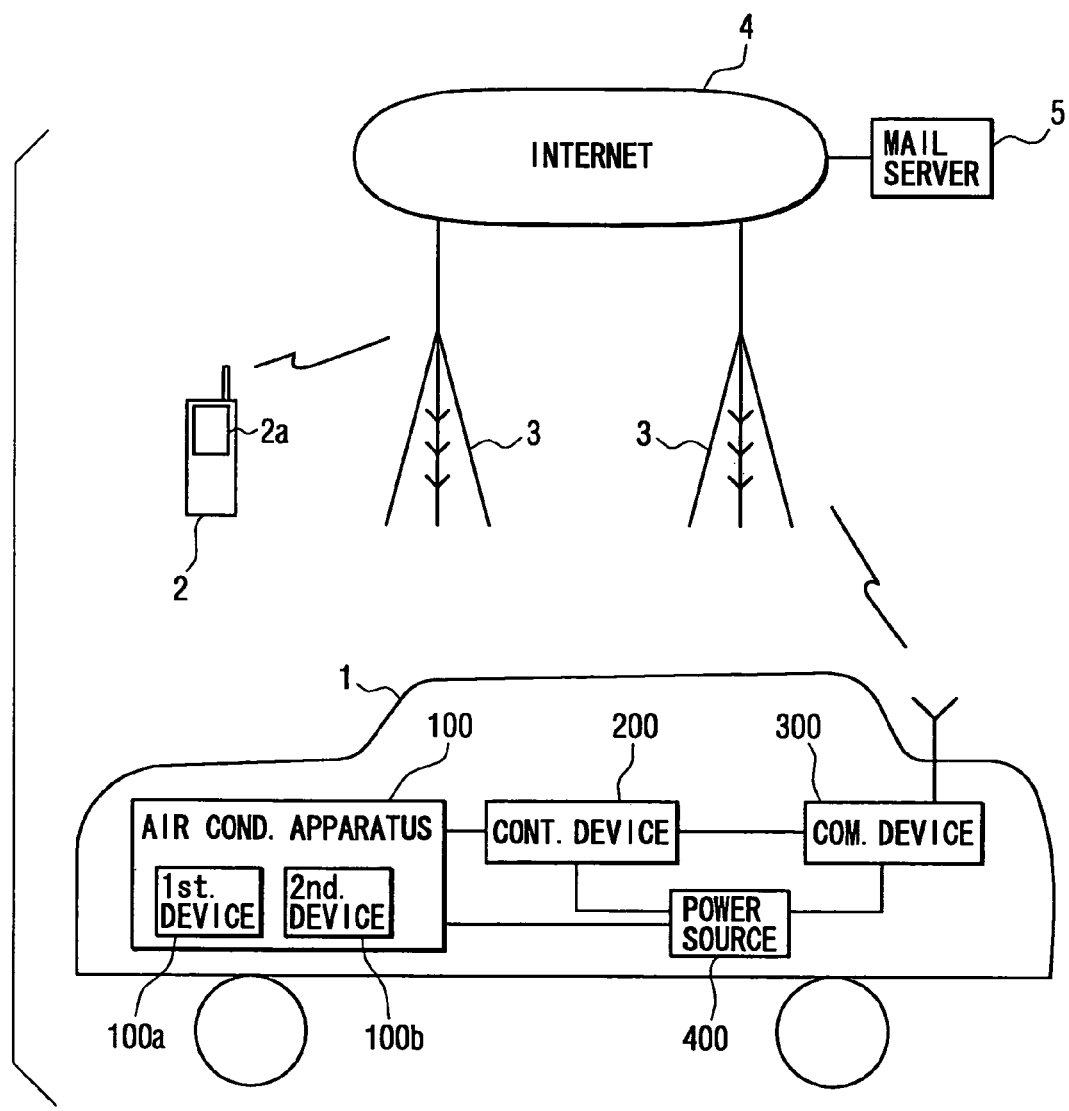
FIG. 1 is a schematic diagram showing an entire structure of air conditioning system according to a first embodiment of the present invention.

FIG. 1 schematically shows a remotely controllable air conditioning system, in which the present invention is embodied.

A vehicle 1 is one of a hybrid vehicle having an engine and an electric power source, an electric vehicle and a fuel-cell vehicle. In this instance, when the vehicle 1 is parked (i.e., when the vehicle 1 is stopped continuously, and an occupant is out of the vehicle 1), electric power is supplied from an electric power source 400, such as a vehicle battery, to an air conditioning apparatus 100, a control device 200 and a communication device (communicating means for communicating with the mobile device 2) 300. Here, the power source 400 serves as a drive source for providing electrical power to drive the air conditioning apparatus 100. A first device 100a of the air conditioning apparatus 100 ventilates a passenger room of the vehicle 1. That is, the first device 100a supplies outside air into the passenger room and/or exchanges the inside air of the passenger room with the outside air. A second device 100b of the air conditioning apparatus 100 includes a refrigeration cycle and performs air-conditioning of the passenger room of the vehicle 1 using the refrigeration cycle.

A mobile device 2 serves as an operating device of the present invention and can be one of a cellular phone, a personal digital assistant (PDA or PDC) and a wireless remote device. The mobile device 2 is connectable to an internet 4 through a radio-communication base station 3. Communicated information of the mobile device 2 is stored in a mail server 5. The mobile device 2 and the communication device 300 of the vehicle 1 communicate with each other to transmit and receive required information through the internet 4. The mobile device 2 has a display arrangement and an operational command input arrangement 2a to facilitate remote control operation. In this embodiment, the display arrangement and the operational command input arrangement are formed as one unit. More specifically, the display arrangement can be constructed as a touch panel display, through which operational commands or operational instructions are inputted. Alternatively, the display arrangement and the operational command input arrangement can be separately provided. In such a case, for example, a keypad (including ten keys and/or alphanumeric keys) of the mobile device 2 can be used as the operational command input arrangement, which is separated from the display arrangement. The operating device is not limited to the mobile device 2 and can be any other appropriate device, which can remotely control the vehicle 1 (more specifically, the air conditioning apparatus 100) through a wire communication system or a wireless communication system. For example, the operating device can be a stationary personal computer, which is connected to a communicating means, such as the internet. Further alternatively, the operating device can be a stationary communication device, such as a stationary telephone or a stationary facsimile device.

Figure 2:
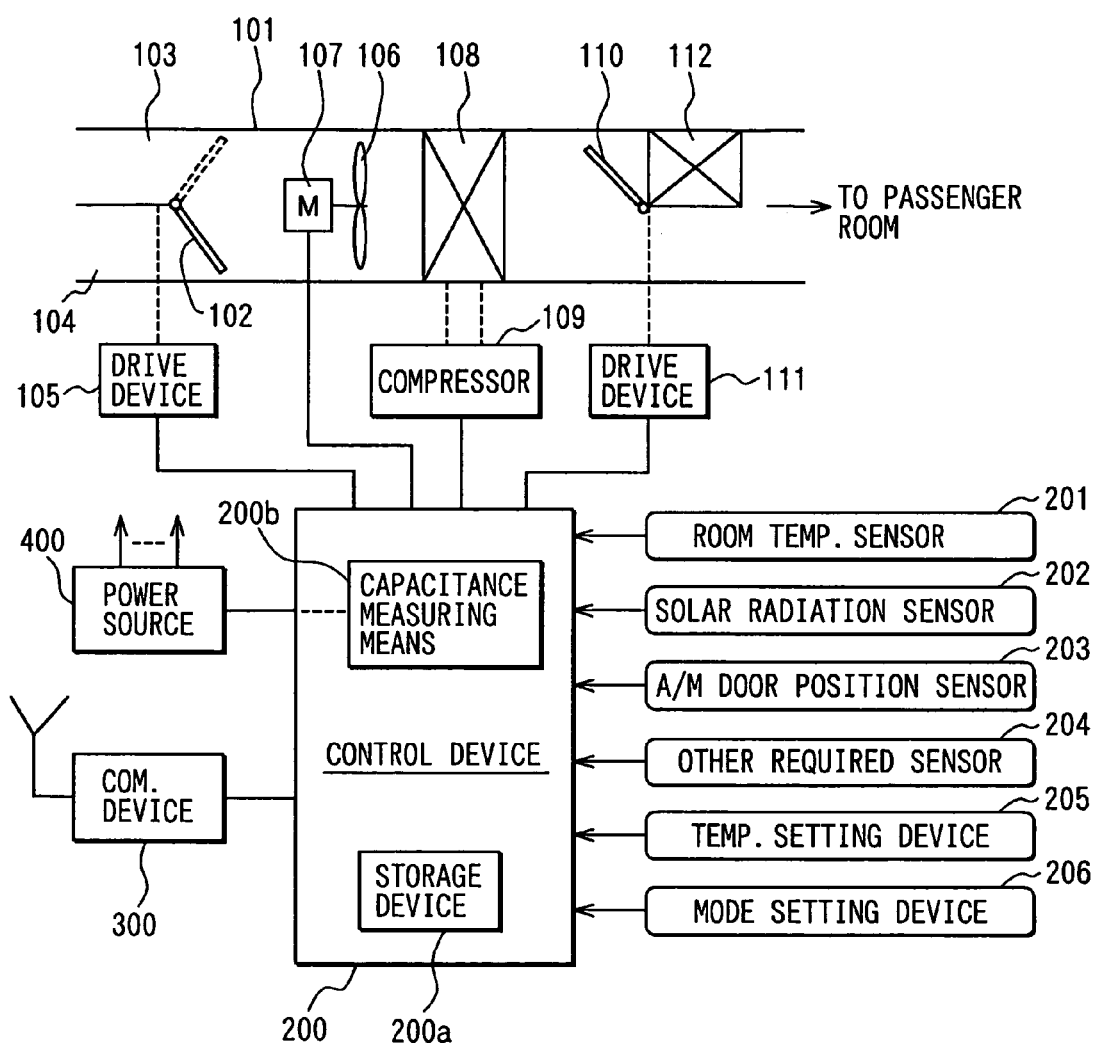
FIG. 2 is a schematic diagram showing an entire structure of an air conditioning apparatus of a vehicle according to the first embodiment.

FIG. 2 is a schematic diagram showing a structure of the air conditioning apparatus of the vehicle 1.

An air duct 101, which is communicated with the passenger room of the vehicle 1, is provided with an outside air passage 103, an inside air passage 104, an inside air/outside air switching door 102, a blower fan 106, a blower motor 107, an evaporator 108, an electric compressor 109, an air-mix door 110, a drive device 111 and a heater core 112. The outside air passage 103 conducts outside air. The inside air passage 104 is communicated with the passenger room and conducts inside air (i.e., air located in the passenger room). The inside air/outside air switching door 102 is drive by a drive device 105 and switches between an outside air intake position and an inside air intake position. At the outside air intake position, the inside air/outside air switching door 102 opens the outside air passage 103 to introduce the outside air. At the inside air intake position, the inside air/outside air switching door 102 opens the inside air passage 104. The blower fan 106 and the blower motor 107 cooperate together to ventilate the passenger room. The evaporator 108 cools the air. The electric compressor 109 supplies refrigerant to the evaporator 108. The air-mix door 110, the drive device 111 and the heater core 112 are used to adjust the temperature of the air to a desired temperature. The drive device 111 drives the air-mix door 110. In the case of the hybrid vehicle, the heater core 112 is a heat exchanger, through which coolant flows. In the case of the electric vehicle and the fuel-cell vehicle, the heater core 112 is an electric heater.

The compressor 109, a condenser (not shown), a receiver (not shown), an expansion valve (not shown) and the evaporator 108 are connected together in this order to form the refrigeration cycle. In this instance, the first device 100a of FIG. 1, which ventilates the passenger room, includes the inside air/outside air switching door 102, the blower fan 106 and the blower motor 107. The second device 100b includes the compressor 109, the evaporator 108, the air-mix door 110 and the heater core 112.

The control device 200 includes a microcomputer, which includes a CPU and a storage device 200a, and peripheral devices. A room temperature sensor 201, a solar radiation sensor 202, an air-mix (A/M) door position sensor 203 and any other required sensor(s) 204 are connected to the control device 200. The room temperature sensor 201 measures the temperature (room temperature or inside air temperature) of the passenger room of the vehicle 1. The solar radiation sensor 202 measures the amount of solar radiation, which enters the passenger room. The air-mix door position sensor 203 measures a position of the air-mix door 110 (i.e., a degree of opening of the air-mix door 110). The control device 200 further includes a capacitance measuring means 200b for measuring a capacitance of the power source 400. The capacitance measuring means 200b measures the capacitance of the power source 400, for example, based on a difference between the amount of charged electricity, which is charged into the power source 400, and the amount of discharged electricity, which is discharged from the power source 400. Alternatively, the capacitance measuring means 200b measures the capacitance of the power source 400 based on an output of a sensor, which measures the remaining charge of the power source 400.

In this instance, an outside air temperature sensor, which measures the outside air temperature at outside of the passenger room, is eliminated. A camera (IR camera), which measures the amount or characteristics of infrared of the passenger room, can be used in place of a regular temperature sensor that serves as the room temperature sensor 201. Furthermore, a temperature setting device 205 and a mode setting device 206 are also connected to the control device 200. The passenger or user sets a desired air temperature of the passenger room through the temperature setting device 205 and also sets a desired operation mode (e.g., a passenger room blow mode for blowing air into the passenger room, an inside air/outside air switching mode or the like) through the mode setting device 206. In addition, it is possible to add a timer setting means for setting a timer for initiating operation of the air conditioning apparatus 100. The control device 200 is always powered and monitors the air conditioning apparatus 100 and the state of the passenger room.

The communication device 300 is a communication functional arrangement, which transmits and receives required information relative to the mobile device 2 and the control device 200. The power source 400 includes a battery and/or a fuel cell to supply electrical power to the drive devices 105, 111, the blower motor 107 and the compressor 109 in addition to the control device 200. It is desirable that the power source 400 can generate a plurality of voltages (e.g., high voltage and low voltage) to provide appropriate power to each corresponding device.

Next, operation of the control device 200, which is a characteristic part of the present invention, will be described with reference to FIGS. 3 to 7.

First, the control device 200 communicates with the mobile device 2 through the communication device 300. Upon reception of a mail from the mobile device 2 at step 501, control moves to step 502. At step 502, it is determined whether the received mail contains an inquiry about vehicle state information, such as the current room temperature, an on/off state of the air conditioning apparatus 100. When the answer to the inquiry at step 502 is "Yes", control proceeds to step 503 where the control device 200 transmits the requested vehicle state information (e.g., operational state information of the air conditioning apparatus) to the mobile device 2 through the communication device 300, which transmits the information upon reception of a transmission instruction from the control device 200. On the other hand, when the answer to the inquiry at step 502 is "No", i.e., when the mail contains an instruction (operational instruction information) relative to ventilation of the passenger room of the parked vehicle or an instruction (operational instruction information) relative to air conditioning of the passenger room of the parked vehicle, the control device 200 performs the following operation.

Before proceeding to description of step 504, contents of an outgoing data screen of the operational command input arrangement and of the display arrangement of the mobile device 2 will be described with reference to FIG. 4. The contents include "ID code", "password", "destination information (e.g., a mail address)" and "subject matter". The "ID code" and "password" serve as user identification information. The contents further include instructions to the air conditioning apparatus, such as "set temperature", "estimated boarding time", "reservation", "immediate" activation, "auto/manual selection setting" "detail settings of ventilation, air conditioning, aromatization, sterilization, negative ion or minus ion generation (not shown in FIG. 4)" and "operation time setting upon selection of manual operation".

The "reservation" is a request or instruction to activate the air conditioning apparatus 100 at or before the estimated boarding time. The "immediate" is a request to immediately activate the air conditioning apparatus 100 at the time of receiving this request. The "detail settings" and "operation time" are command values used upon selection of the "manual". At the time of performing a remote monitoring operation or a remote control operation of the air conditioning apparatus 100 through the mobile device 2, user authentication is required. However, an input operation of the "user code" and "password" is bothersome. Thus, it is possible to connect a remote control key device to the mobile device 2 to automatically perform the user authentication. Although the screen shown in FIG. 4 is an exemplary screen indicated upon selection of the "manual", the following description is about a case where the "auto" is selected and is instructed.

Contents of an incoming data screen of the mobile device 2 will be described with reference to FIG. 5. The contents of the incoming data screen include "sender", "destination", and "subject matter". Furthermore, the contents of the incoming data screen further include "set temperature", "room temperature", "estimated necessary time period" and "operational state" as information of the vehicle 1.

Referring back to FIG. 3, at step 504, a thermal load, which is required due to the elimination of the outside air temperature sensor, is computed. Then, at step 505, time (the estimated necessary time period) t00, which is required to change the room temperature Tr to a set temperature Tc, is computed. In this instance, although the room temperature Tr is used as the thermal load, the thermal load can be computed based on the amount of solar radiation and the room temperature or alternatively based on the amount of solar radiation and a measured temperature (room temperature substitution value), which is obtained based on the amount of infrared present in the passenger room.

Figure 6:
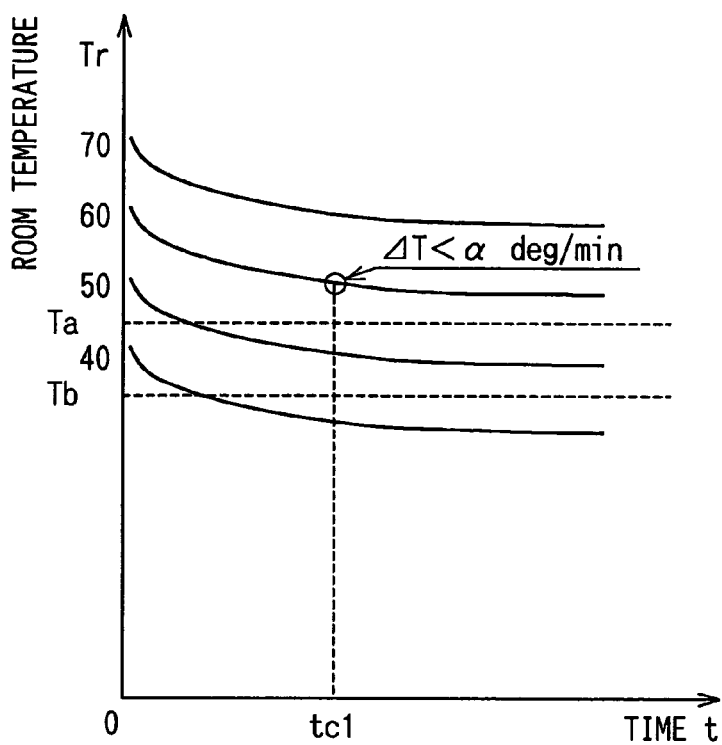
FIG. 6 is a characteristic diagram showing change of the room temperature with respect to time for various initial room temperatures, which are measured at the time of initiation of ventilation of a passenger room of the vehicle.
Figure 7:
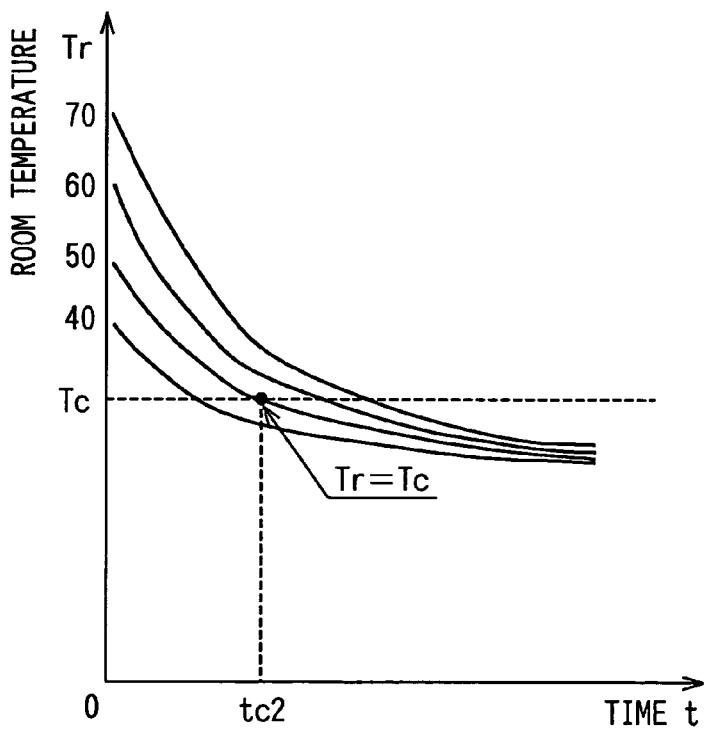
FIG. 7 is a characteristic diagram showing change of the room temperature with respect to time for various initial room temperatures, which are measured at the time of initiation of air conditioning of the passenger room of the vehicle.

FIGS. 6 and 7 show characteristic diagrams for computing the time (the estimated necessary time period) t00, which is required to change the room temperature Tr to the set temperature Tc. The characteristic values are arranged in a form of a data table and are stored in the storage device 200a of the control device 200. The estimated necessary time period t00 is a sum of a time period tc1, which is required to complete the ventilation of the passenger room (FIG. 6 shows a case where the initial room temperature is 60 degrees Celsius at the time of initiation of the ventilation), and a time period tc2, which is required to complete air conditioning of the passenger room (FIG. 7 shows a case where the initial room temperature is 50 degrees Celsius). That is, the estimated necessary time period t00 is expressed by the following equation.

$$t00 = tc1 + tc2$$

More specifically, FIG. 6 shows change of the room temperature Tr of the parked vehicle 1 in the ventilation operation with respect to time for various cases where the different initial room temperatures Tr measured at the time of initiation of the ventilation operation are used. At the time of obtaining the result shown in FIG. 6, the inside air/outside air switching door 102 shown in FIG. 2 is held in an outside air intake position to intake the outside air. Furthermore, at this time, the air-mix door 110 is shifted to a heater core closing position to close the heater core 112. Also, at this time, the blower fan 106 is operated at a predetermined air flow rate. FIG. 7 shows change of the room temperature Tr of the parked vehicle 1 in the cooling operation with respect to time for various cases where the different initial room temperatures Tr measured at the time of initiation of the cooling operation are used. At the time of obtaining the result shown in FIG. 7, the electric compressor 109 is driven in the parked vehicle 1, and the air conditioning apparatus is operated at a predetermined cooling capacity. The results shown in FIGS. 6 and 7 are obtained under the assumption that the outside air temperature and the amount of solar radiation are held constant.

Referring back to FIG. 3, at step 506, it is determined whether the room temperature Tr is less than a first temperature Tb, which is equal to or close to a comfortable temperature that is comfortable to the passenger. When the answer to the inquiry at step 506 is "No", i.e., when the room temperature Tr is equal to or higher than the first temperature Tb, control proceeds to step 507, and the following control operation is initiated upon selection of at least one of the ventilation operation and the cooling operation. A remaining time period tss left before boarding of the passenger into the vehicle 1 is a difference between the current time and the estimated boarding time, which is transmitted from the mobile device 2. It should be understood that the timer setting means described above can be provided to the control device 200, and the estimated boarding time, which is set by the timer setting means, can be used in place of the above estimated boarding time.

At step 507, it is determined whether the estimated necessary time period t00 is greater than the remaining time period tss. When the answer to the inquiry at step 507 is "No", i.e., when the remaining time period tss is equal to or longer than the estimated necessary time period t00, control proceeds to step 508 to perform a ventilation control operation. Before proceeding to the ventilation control operation, it is determined whether a capacitance of the power source 400 is sufficient to drive the blower motor 107 based on information of the capacitance measuring means 200b at step 508. When the answer to the inquiry at step 508 is "Yes", i.e., when the capacitance is sufficient (the capacitance of the power source>set value A), control proceeds to step 509. At step 509, the drive devices 105, 111 are controlled such that the inside air/outside air switching door 102 is switched to the outside air intake position, and the air-mix door 110 is fully opened and is held in a cooling position. Then, the blower motor 107 is driven to ventilate the passenger room. At this time, ventilation initiation information is notified (mailed) to the mobile device 2 through the communication device 300.

At step 510, the time of termination of the ventilation operation is determined as follows. That is, it is determined that the ventilation operation should be terminated when a change ΔTr in the room temperature Tr, which is measured by the room temperature sensor 201, per unit time is smaller than a set value α (degrees/minute). That is, it is determined that the the ventilation operation should be terminated when a substantial decrease in the room temperature no longer exists. Alternatively, a ventilation time period tc1 can be determined based on the data table of the characteristic diagram of FIG. 6 stored in the storage device 200a and the room temperature Tr measured at the time of initiating the ventilation operation. When time t, which is elapsed after the initiation of the ventilation operation, reaches the ventilation time period tc1, it is determined that the ventilation operation should be terminated.

At step 510, when one of the above conditions (i.e., ΔTr<α or t>tc1) is satisfied, and the room temperature Tr is higher than a second temperature Ta (Ta>Tb), control proceeds to step 511 to perform an air conditioning control operation using the refrigeration cycle. When any one of the above two conditions (i.e., ΔTr<α or t>tc1 and Tr>Ta) is not satisfied at step 510, the ventilation operation continues until the above conditions are all satisfied. However, when the room temperature Tr drops below the first temperature Tb during the ventilation operation, the ventilation operation is terminated at step 506, and the thermal load and the estimated necessary time period t00 are recomputed at steps 504 and 505.

On the other hand, when the remaining time period tss is less than the estimated necessary time period t00 (i.e., "Yes" at step 507), the room temperature Tr needs to be rapidly decreased. Thus, control should now proceeds to steps 511–513 to perform the air conditioning control operation with a higher priority than the ventilation operation. More specifically, the second device 100b is given a higher priority over the first device 100a and is thus operated first by the control device 200 to perform the air conditioning of the passenger room.

Before proceeding to the air conditioning control operation, it is determined whether a capacitance of the power source 400 is sufficient to drive the compressor 109 based on information of the capacitance measuring means 200b at step 511. When the answer to the inquiry at step 511 is "Yes", i.e., when the capacitance is sufficient (the capacitance of the power source>set value B, which is greater than the set value A), control proceeds to step 512. At step 512, the compressor 109 is driven to perform the air conditioning of the passenger room. At the same time, the air conditioning initiation information is notified (mailed) to the mobile device 2 through the communication device 300.

At steps 513, the time of termination of the air conditioning operation is determined as follows. That is, it is determined that the air conditioning operation should be terminated when the room temperature Tr measured by the room temperature sensor 201 is less than a set temperature Tc. Alternatively, the air conditioning time period tc2 can be determined based on the data table of the characteristic diagram of FIG. 7 stored in the storage device 200a and the room temperature Tr measured at the time of initiating the air conditioning operation. When time t, which is elapsed after the initiation of the air conditioning operation, reaches the air conditioning time period tc2, it is determined that the air conditioning operation should be terminated. Further alternatively, the air conditioning operation can be terminated when a change ΔTr in the room temperature Tr, which is measured by the room temperature sensor 201, per unit time is smaller than a set value β (degrees/minute), which is larger than the set value α. That is, the air conditioning operation can be terminated when a substantial decrease in the room temperature no longer exists. At the same time, air conditioning termination information is notified (mailed) to the mobile device 2 through the communication device 300.

SECOND EMBODIMENT

Figure 8:
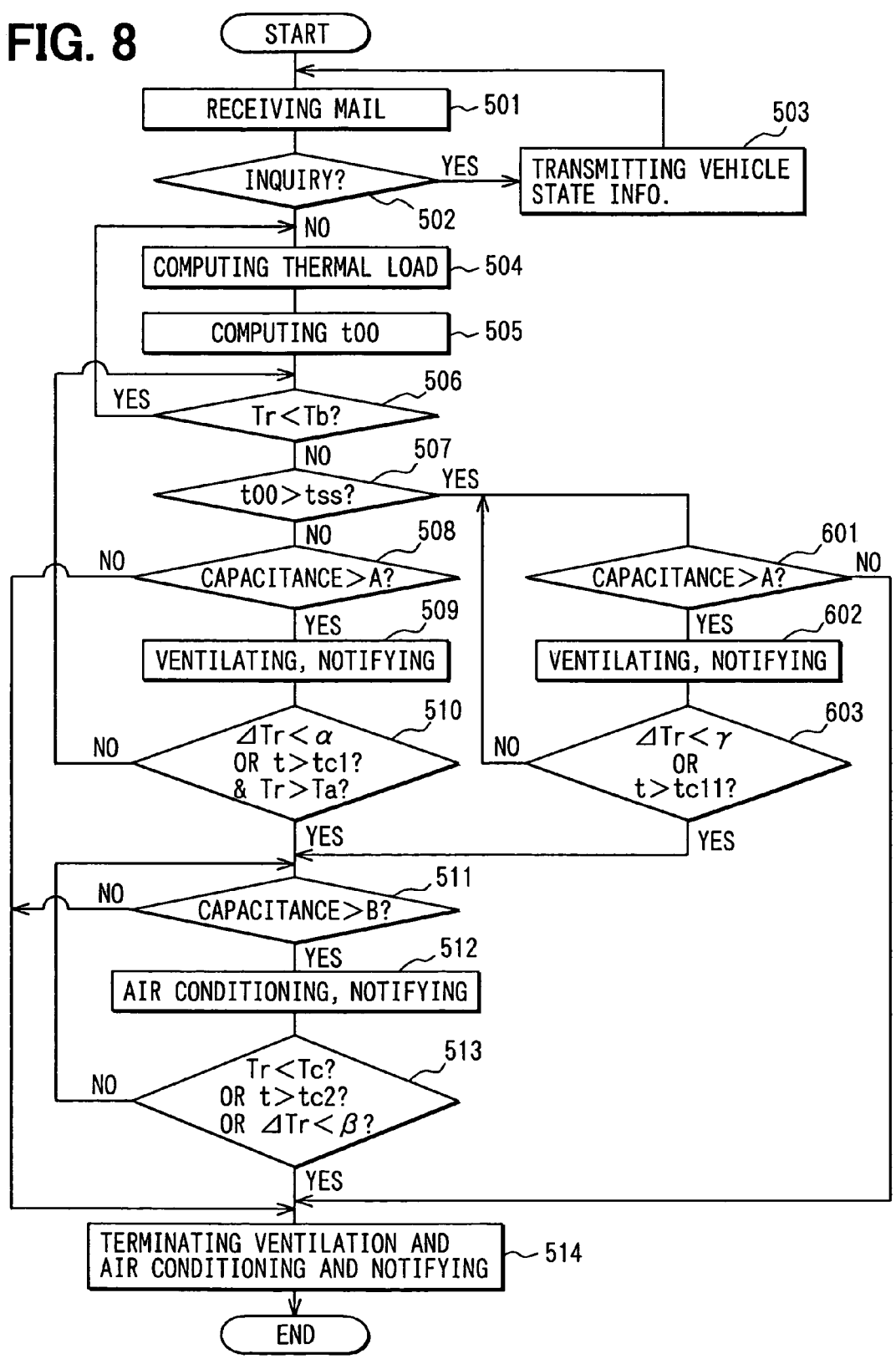
FIG. 8 is a flowchart showing operation according to a second embodiment of the present invention.

In the first embodiment, the basic operation at the time of "automatic" control of the air conditioning apparatus of the vehicle through the mobile device 2 is described. A second embodiment shown in FIG. 8 is substantially the same as the first embodiment except newly added steps 601–603. That is, at step 507, when the remaining time period tss before boarding of the passenger into the vehicle 1 is shorter than the estimated necessary time period t00, the room temperature Tr should to be rapidly decreased before the passenger gets into the vehicle 1. However, in the second embodiment, the air conditioning operation is not performed immediately prior to the ventilation operation. Instead, the ventilation operation is performed for a short period of time to improve the air conditioning efficiency, and thereby the load on the compressor 109 is reduced to reduce the power consumption.

Since the second embodiment is similar to the first embodiment except steps 601–603, only steps 601–603 are described in detail below. At step 601, it is determined whether a capacitance of the power source 400 is sufficient to drive the blower motor 107 based on information of the capacitance measuring means 200b. When the answer to the inquiry at step 601 is "Yes", i.e., when the capacitance is sufficient (the capacitance of the power source>set value A), control proceeds to step 602. At step 602, the blower motor 107 is driven to ventilate the passenger room. At this time, ventilation initiation information is notified (mailed) to the mobile device 2 through the communication device 300.

The ventilation operation is terminated when a change ΔTr in the room temperature Tr, which is measured by the room temperature sensor 201, per unit time is smaller than a set value γ (degrees/minute), which is greater than the set value α. That is, the ventilation operation is terminated when a substantial decrease in the room temperature Tr is obtained. Alternatively, the ventilation operation can be terminated when time t, which is elapsed after the initiation of the ventilation operation, reaches a predetermined ventilation time period tc11, which is a predetermined time period required to achieve the substantial decrease in the room temperature Tr.

THERD EMBODIMENT

Figure 9:
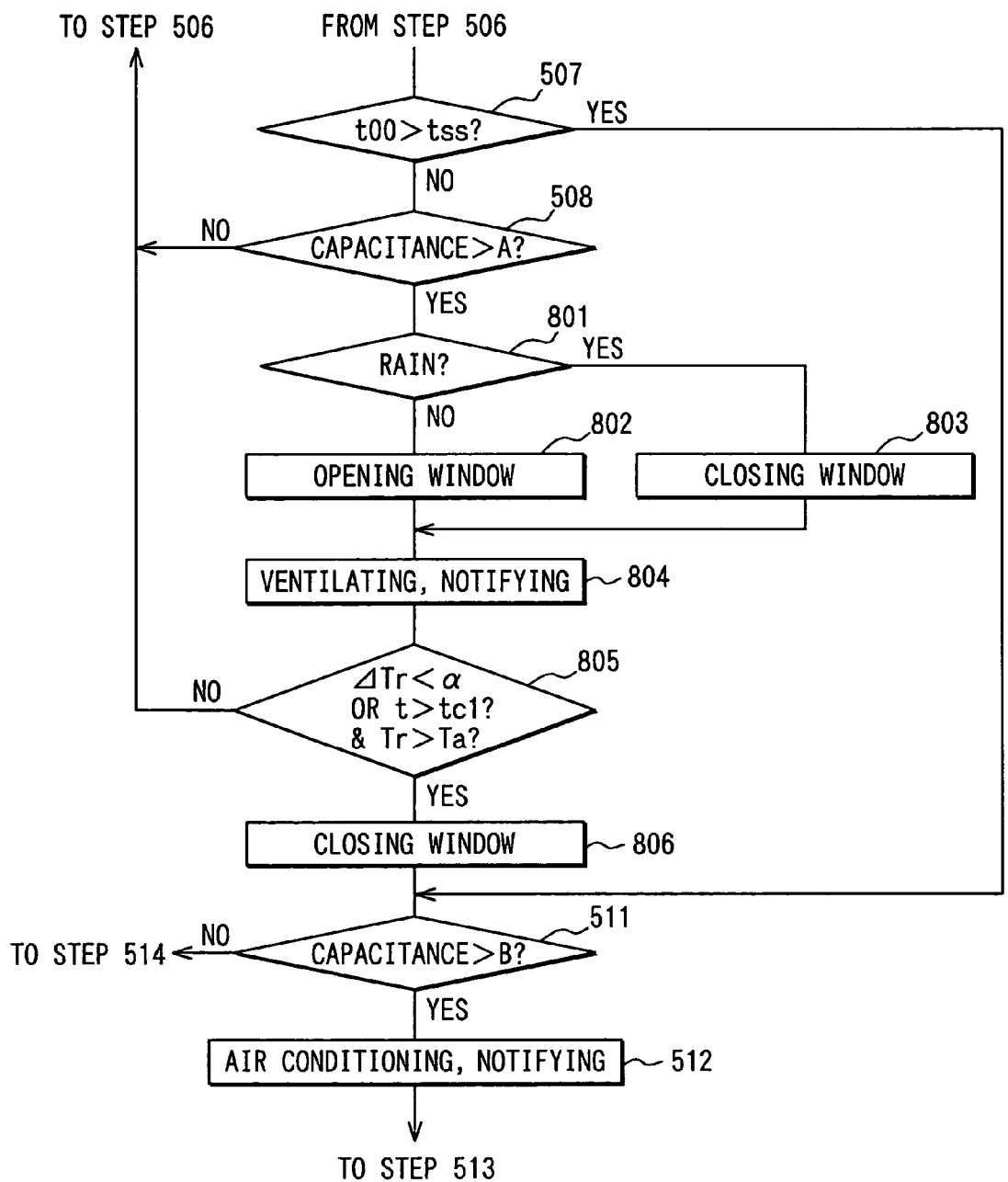
FIG. 9 is a flowchart showing operation according to a third embodiment of the present invention.

In a third embodiment shown in FIG. 9, the ventilation operation (steps 509 and 510) of the first embodiment is replaced with steps 801–806 to slightly open a window glass, a sunroof (sunroof panel) or the like of the vehicle 1 depending on weather. Here, the window glass, the sunroof panel and the like are collectively referred to as a window panel, which is communicated with the passenger room.

Since the third embodiment is similar to the first embodiment except steps 801–806, only steps 801–806 are described in detail below.

At step 801, it is determined whether weather is rain or is likely rain based on a measurement of a rain sensor (not shown) or based on weather information of a subject local area, which is obtained from, for example, a corresponding homepage of the internet 4 through the communication device 300. In the latter case, the vehicle 1 should have a position sensor, such as a GPS sensor, which provides information relative to a current position of the vehicle, to get accurate weather information of the subject local area. When the answer to the inquiry at step 801 is "No", i.e., when the weather is not rain or not likely rain, control proceeds to step 802. At step 802, the window glass, the sunroof or the like is slightly opened. On the other hand, when the answer to the inquiry at step 801 is "Yes", i.e., the weather is rain or is likely rain, the window glass, the sunroof or the like is left closed. At steps 804 and 805, the ventilation operation is performed and is terminated in a manner similar to that described at steps 509 and 510 of the first embodiment. Then, at step 806, the window glass, the sunroof or the like is closed.

FOURTH EMBODIMENT

In each of the first to third embodiments, the "automatic" control of the air conditioning apparatus of the vehicle 1 through the mobile device 2 is described. In a fourth embodiment shown in FIG. 10, the control device 200 is operated to perform one of the "automatic" and "manual" controls based on a corresponding instruction (instruction information) transmitted from the mobile device 2.

Figure 10:
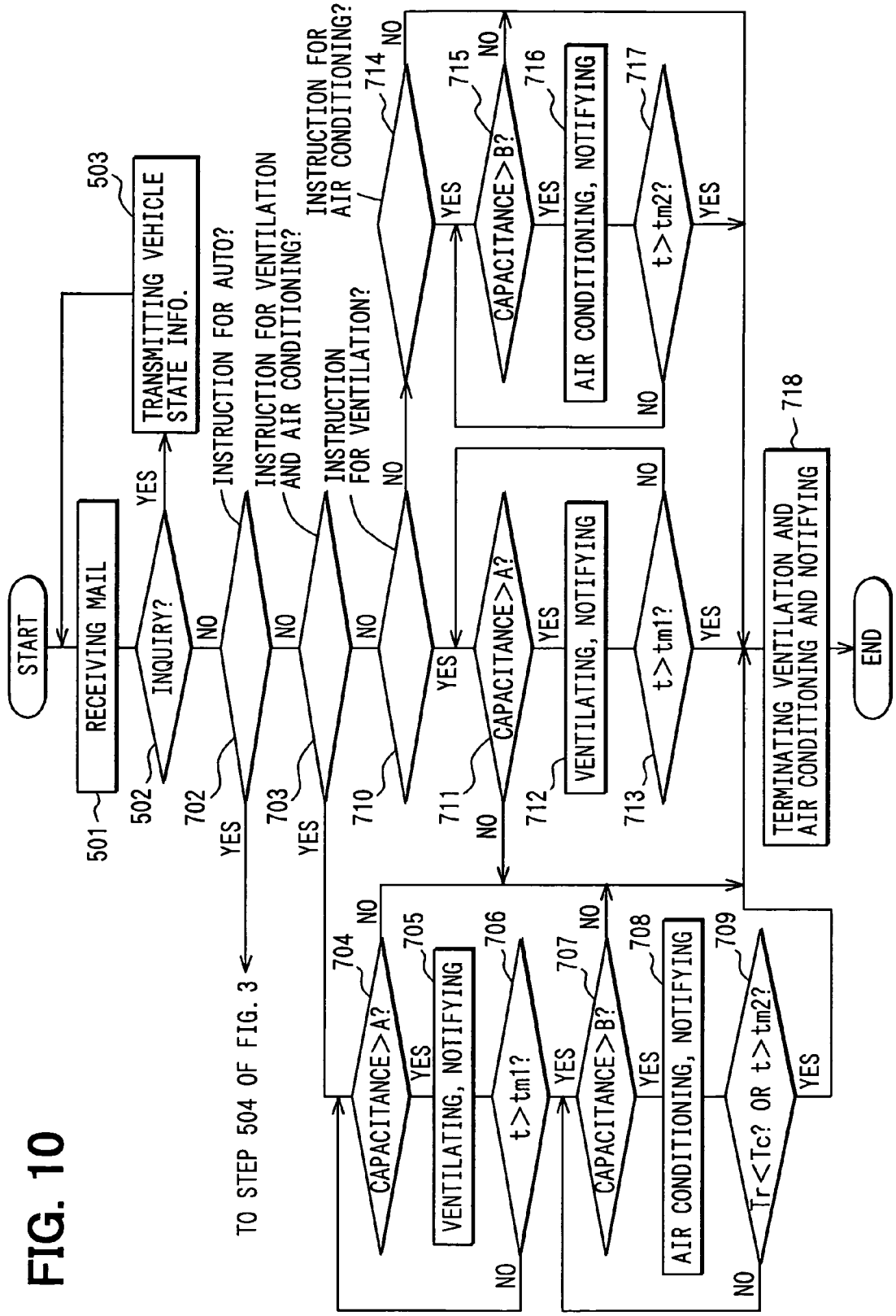
FIG. 10 is a flowchart showing operation according to a fourth embodiment of the present invention.

In the fourth embodiment shown in FIG. 10, step 702 is inserted between step 502 and step 504 of the first embodiment shown in FIG. 3 to determine whether the instruction received from the mobile device 2 is an instruction for initiating the "automatic" control or an instruction for initiating the "manual" control. More specifically, at step 702, it is determined whether the instruction received from the mobile device 2 is the instruction for initiating the "automatic" control. When the answer to the inquiry at step 702 is "Yes", i.e., when the instruction is for initiating the "automatic" control, control proceeds to step 504 of FIG. 3 and performs steps 504–514. On the other hand, when the answer to the inquiry at step 702 is "No", i.e., when the instruction is for initiating the "manual" control, control proceeds to steps 703 to perform steps 703–718.

Now, the "manual" control will be described in detail below.

First, when it is determined that the instruction received from the mobile device 2 is the instruction for initiating the "manual" control at step 702, control proceeds to step 703. At step 703, the settings (FIG. 4) selected at the mobile device 2 are checked, and it is determined whether the instruction for performing the "ventilation" operation and the instruction for performing the "air conditioning" operation are both present. When the answer to the inquiry at step 703 is "Yes", control proceeds to step 704. At step 704, similar to step 508 of FIG. 3, it is determined whether a capacitance of the power source 400 is sufficient to drive the blower motor 107 based on information of the capacitance measuring means 200b. When the answer to the inquiry at step 704 is "Yes", i.e., when the capacitance is sufficient (the capacitance of the power source>set value A), control proceeds to step 705. At step 705, the drive devices 105, 111 are controlled such that the inside air/outside air switching door 102 is switched to the outside air intake position, and the air-mix door 110 is fully opened and is held in the cooling position. Then, the blower motor 107 is driven to ventilate the passenger room. At this time, ventilation initiation information is notified (mailed) to the mobile device 2 through the communication device 300.

At step 706, the ventilation operation is terminated when a predetermined ventilation time period tm1 (this time period is operation time of the first device 100a and is set to 15 minutes in the instance shown in FIG. 4), which has been set through the mobile device 2, has elapsed since the time of initiating the ventilation operation.

Next, at step 707, it is determined whether a capacitance of the power source 400 is sufficient to drive the electric compressor 109 based on information of the capacitance measuring means 200b. When the answer to the inquiry at step 707 is "Yes", i.e., when the capacitance is sufficient (the capacitance of the power source>set value B, which is greater than the set value A), control proceeds to step 708. At step 708, the compressor 109 is driven to perform the air conditioning operation of the passenger room. At this time, air conditioning initiation information is notified (mailed) to the mobile device 2 through the communication device 300.

Then, at step 709, it is determined whether the room temperature Tr measured through the room temperature sensor 201 is lower than a set temperature Tc. Alternatively, it may be determined whether an air conditioning time period tm2 (this time period is operation time of the second device 100b and is set to 5 minutes in the instance shown in FIG. 4), which has been set through the mobile device 2, has elapsed since the time of initiating the air conditioning operation. When the answer to the inquiry at step 709 is "Yes", the air conditioning operation is terminated.

When the answer to the inquiry at step 703 is "No", control proceeds to step 710. At step 710, it is determined whether the instruction for performing the "ventilation" operation is present. When the answer to the inquiry at step 710 is "Yes", i.e., when the instruction for performing the "ventilation" operation is present, control proceeds to step 711. Steps 711–713, which are similar to steps 704–706 and are thus not described in detail, are performed. The ventilation operation initiated at step 712 is terminated at step 718 when it is determined that the predetermined ventilation time period tm1 (this time period is operation time of the first device 100a and is set to 15 minutes in the instance shown in FIG. 4), which has been set through the mobile device 2, has elapsed since the time of initiating the ventilation operation at step 713.

Next, when the answer to the inquiry at step 710 is "No", control proceeds to step 714. At step 714, it is determined whether the instruction for performing the "air conditioning" operation is present. When the answer to the inquiry at step 714 is "Yes", control proceeds to step 715. Then, steps 715–717, which are similar to steps 707–709 and are thus not described in detail, are performed. The air conditioning operation initiated at step 716 is terminated at step 718 when it is determined that the predetermined time period tm2 (this time period is operation time of the second device 100b and is set to 5 minutes in the instance shown in FIG. 4), which has been set through the mobile device 2, has elapsed since the time of initiating the air conditioning operation at step 717.

The above embodiments can be modified as follows.

In each of the first to third embodiments, the operation is switched between the ventilation operation and the air conditioning operation through comparison of the remaining time period tss before boarding of the passenger into the vehicle 1 and the estimated necessary time period too. However, it should be noted that step 507 can be eliminated, and the ventilation operation and the air conditioning operation can be performed through steps 508–514. Alternatively, the ventilation operation of the passenger room and the air conditioning operation of the passenger room can be switched based on the thermal load of the passenger compartment of the vehicle 1 (such as a temperature difference between the room temperature Tr and the outside air temperature or the room temperature alone) at step 507. For example, when the temperature difference is relatively small, or when the room temperature is close to the target temperature, the ventilation operation is performed with a higher priority than the air conditioning operation to minimize the wasteful power consumption.

In each of the first to fourth embodiments, the outside air temperature sensor, which measures the outside air temperature, is eliminated, and the air conditioning apparatus 100 is controlled based on the room temperature sensor (including the IR sensor) and the data tables, which show the room temperature characteristics of FIGS. 6 and 7. However, the present invention is not limited to this arrangement. For example, both the room temperature sensor 201 and the outside air temperature sensor can be provided. In such a case, the control device 200 can be constructed to obtain the thermal load of the passenger compartment of the vehicle 1 based on measurements of both the room temperature sensor 201 and the outside air temperature sensor and controls the air conditioning apparatus 100 to select at least one of the ventilation operation of the passenger room and the air conditioning operation of the passenger room.

Furthermore, in the mobile device 2, the "aromatization" is present as one of the settings shown in FIG. 4. This is a control operation of aroma in the passenger room of the vehicle 1 performed upon selection of the "aromatization" through the operational command input arrangement by the user to improve the comfortability of the passenger compartment upon boarding of the user into the passenger room. Thus, a door sensor (not shown) and an aroma generator (not shown) may be provided in the vehicle 1. When the control device 200 receives an instruction for performing the "aromatization", the control device 200 operates the aroma generator upon sensing the boarding of the user into the vehicle 1 to supply the aroma from the aroma generator to the passenger room through, for example, a room air purifier. In place of the output from the door sensor, the "estimated boarding time" instructed through the mobile device 2 can be used by the control device 200 to supply the aroma from the aroma generator to the passenger room slightly before the "estimated boarding time". Further alternatively, the mobile device 2 can have, for example, a GPS device to allow detection of the current position of the mobile device 2. The control device 200 receives information of the current position of the mobile device 2 from the mobile device 2 and initiates the "aromatization" control upon detection of approach of the mobile device 2 to the vehicle 1 based on the information of the current position of the mobile device 2.

In each of the above embodiments, the vehicle 1 is one of the hybrid vehicle, the electric vehicle, the fuel-cell vehicle, a tracked vehicle, a ship or any other vehicle and has the electric power source (drive source) 400 of the air conditioning apparatus 100. However, the present invention can be embodied in a vehicle, which has an internal combustion engine. In such a case, the engine can be used as a drive source of the air conditioning apparatus 100, and the control device starts the engine upon receiving a corresponding instruction from the mobile device 2 and controls the air conditioning apparatus 100 to perform at least one of the ventilation operation of the passenger room and the air conditioning operation of the passenger room upon selection of the same. Here, the engine serves as a drive source for providing mechanical power to drive the air conditioning apparatus 100.

The arrangement of the air conditioning apparatus 100 is not limited to the one depicted in FIG. 2 and can be changed to any other appropriate one as long as the ventilation operation and the air conditioning operation of the passenger room of the vehicle 1 can be controlled through the control device 200.

Additional advantages and modifications will readily occur to those skilled in the art. The invention in its broader terms is therefore not limited to the specific details, representative apparatus, and illustrative examples shown and described.

What is claimed is:

1. An air conditioning system for a vehicle, the air conditioning system comprising:

a room temperature sensor that measures a room temperature of a passenger room of the vehicle;

an operating device that is provided separately from the vehicle and is operable at a location remote from the vehicle;

an air conditioning apparatus that is provided in the vehicle and includes:

a first device that performs ventilation of the passenger room of the vehicle; and a second device that includes a refrigeration cycle and performs air conditioning of the passenger room;

at least one drive source that is provided in the vehicle and supplies power to the air conditioning apparatus; and a control device that is provided in the vehicle to control the air conditioning apparatus and thereby to control the ventilation and the air conditioning of the passenger room, wherein the operating device communicates with the control device in a parked state of the vehicle to selectively control the first device and the second device in such a manner that the control device selects at least one from the first device and the second device and operates the selected at least one of the first device and the second device upon reception of a corresponding operational instruction from the operating device when the room temperature, which is measured through the room temperature sensor, is equal to or higher than a first temperature; wherein the control device determines a thermal load based on temperature information, which includes the room temperature of the passenger room measured through the room temperature sensor; and the first device is given a higher priority over the second device and is thus operated first by the control device to ventilate the passenger room upon reception of the corresponding operational instruction from the operating device when the room temperature of the passenger room is equal to or higher than the first temperature.

2. The air conditioning system according to claim 1, wherein:

the at least one drive source includes an electric power source;

the air conditioning apparatus is operated by electric power supplied from the electric power source when the vehicle is in the parked state; and the control device enables operation of the first device and operation of the second device when a capacitance of the electric power source is equal to or greater than a predetermined value.

3. The air conditioning system according to claim 1, further comprising a communicating means for communicating with the operating device, wherein:

the communicating means is provided in the vehicle and is communicated with the control device;

when the communicating means receives operational instruction information of the air conditioning apparatus from the operating device, the communicating means transmits the operational instruction information to the control device; and when the communicating means receives a corresponding transmission instruction from the control device, the communicating means transmits operational state information of the air conditioning apparatus to the operating device to display the operational state information on the operating device.

4. The air conditioning system according to claim 1, wherein:

the operating device includes an operational command input arrangement, through which an instruction for selecting and operating at least one of the first device and the second device is inputted by a user; and the control device selectively operates at least one of the first device and the second device based on the instruction inputted through the operational command input arrangement.

5. The air conditioning system according to claim 4, wherein:

the operational command input arrangement enables the user to selectively specify and input operation time of the first device and operation time of second device; and the control device operates the first device and the second device based on the operation time of the first device and the operation time of the second device, respectively, which are specified and are inputted through the operational command input arrangement.

6. The air conditioning system according to claim 1, wherein the operating device is a mobile device, which is operable at the location remote from the vehicle and communicates with the control device through radio communication.

7. The air conditioning system according to claim 1, wherein the operating device is a mobile device, which is operable at the location remote from the vehicle and communicates with the control device through radio communication.

8. The air conditioning system according to claim 2, wherein the operating device is a mobile device, which is operable at the location remote from the vehicle and communicates with the control device through radio communication.

9. The air conditioning system according to claim 3, wherein the operating device is a mobile device, which is operable at the location remote from the vehicle and communicates with the control device through radio communication.

10. The air conditioning system according to claim 4, wherein the operating device is a mobile device, which is operable at the location remote from the vehicle and communicates with the control device through radio communication.

11. An air conditioning system for a vehicle, the air conditioning system comprising:

a room temperature sensor that measures a room temperature of a passenger room of the vehicle;

an operating device that is provided separately from the vehicle and is operable at a location remote from the vehicle;

an air conditioning apparatus that is provided in the vehicle and includes:

a first device that performs ventilation of the passenger room of the vehicle; and a second device that includes a refrigeration cycle and performs air conditioning of the passenger room;

at least one drive source that is provided in the vehicle and supplies power to the air conditioning apparatus; and a control device that is provided in the vehicle to control the air conditioning apparatus and thereby to control the ventilation and the air conditioning of the passenger room, wherein:

the operating device communicates with the control device in a parked state of the vehicle to selectively control the first device and the second device in such a manner that at least one of the first device and the second device is selectively operated upon reception of a corresponding operational instruction from the operating device;

the control device determines a thermal load based on temperature information, which includes the room temperature of the passenger room measured through the room temperature sensor;

the operating device includes an operational command input arrangement for inputting:

an operational instruction for operating the air conditioning apparatus; and estimated boarding time, which indicates estimated time of boarding of a user into the vehicle;

the control device receives the operational instruction for operating the air conditioning apparatus and the estimated boarding time from the operating device and determines an estimated necessary time period, which is required to change the room temperature to a target temperature by operation of the air conditioning apparatus; and when the estimated necessary time period is less than a remaining time period left before the estimated boarding time, the first device is given a higher priority over the second device and is thus operated first by the control device to ventilate the passenger room.

12. The air conditioning system according to claim 11, wherein: the control device obtains weather information around the vehicle; and when the control device determines that weather is not rain or is not likely rain around the vehicle based on the weather information, the control device opens a window panel of the vehicle, which is communicated with the passenger room, to ventilate the passenger room and operates the first device.

13. The air conditioning system according to claim 11, wherein when the estimated necessary time period, which is received from the operating device, is longer than the remaining time period left before the estimated boarding time, the second device is given a higher priority over the first device and is thus operated first by the control device to perform the air conditioning of the passenger room.

14. The air conditioning system according to claim 13, wherein the control device operates the first device for a predetermined time period prior to operation of the second device.

* * * * *